(12) United States Patent
Dantin et al.

(10) Patent No.: US 8,006,931 B2
(45) Date of Patent: Aug. 30, 2011

(54) AIRCRAFT WING ARRANGEMENT COMPRISING AN ENGINE ATTACHMENT PYLON DEFINING, IN THE FORWARD REGION, A LATERAL AIRFLOW CHANNEL

(75) Inventors: Stephanie Dantin, Leguevin (FR); Thierry Fol, Grenade (FR); Ludovic Gerard, Plaisance du Touch (FR); Philippe Jimenez, Toulouse (FR)

(73) Assignee: AIRBUS France, Toulouse (FR)

( * ) Notice: Subject to any disclaimer, the term of this patent is extended or adjusted under 35 U.S.C. 154(b) by 533 days.

(21) Appl. No.: 12/282,519

(22) PCT Filed: Mar. 28, 2007

(86) PCT No.: PCT/EP2007/052957
§ 371 (c)(1),
(2), (4) Date: Sep. 11, 2008

(87) PCT Pub. No.: WO2007/113183
PCT Pub. Date: Oct. 11, 2007

(65) Prior Publication Data
US 2009/0032639 A1    Feb. 5, 2009

(30) Foreign Application Priority Data

Mar. 31, 2006  (FR) ..................................... 06 51136

(51) Int. Cl.
*B64D 27/00* (2006.01)
(52) U.S. Cl. .......................................... 244/54; 244/55
(58) Field of Classification Search ................... 244/54, 244/55; 60/796, 797; 248/554, 557
See application file for complete search history.

(56) References Cited

U.S. PATENT DOCUMENTS

| | | | | |
|---|---|---|---|---|
| 4,643,376 | A | * | 2/1987 | Vanderhoeven .............. 244/198 |
| 5,443,230 | A | * | 8/1995 | Lord et al. ....................... 244/54 |
| 5,653,406 | A | * | 8/1997 | Amano et al. ................. 244/130 |
| 7,866,608 | B2 | * | 1/2011 | Atinault ..................... 244/199.1 |

FOREIGN PATENT DOCUMENTS

| | | |
|---|---|---|
| GB | 2 144 688 | 3/1985 |
| WO | 95 17334 | 6/1995 |

* cited by examiner

*Primary Examiner* — Kaitlin S Joerger
(74) *Attorney, Agent, or Firm* — Oblon, Spivak, McClelland, Maier & Neustadt, L.L.P.

(57) ABSTRACT

An aircraft wing arrangement including a wing and at least one strut for attaching the aircraft engine suspended under the wing and including a front zone situated projecting towards the front with respect to a leading edge of the wing. The front zone includes a lateral projection delimiting a lateral air flow channel while being projected towards a proximal end of the wing.

7 Claims, 5 Drawing Sheets

AIRCRAFT WING ARRANGEMENT COMPRISING AN ENGINE ATTACHMENT PYLON DEFINING, IN THE FORWARD REGION, A LATERAL AIRFLOW CHANNEL

The present invention relates in general terms to an aircraft wing arrangement of the type comprising a wing and at least one aircraft engine attachment strut suspended under this same wing.

As is known, an attachment strut, also referred to as "EMS" (from the English "Engine Mounting Structure"), makes it possible to suspend the engine below the wing of the aircraft, by means of a mounting system comprising a plurality of engine attachments. In fact it is provided for forming the connection interface between an engine such as a jet engine and the aircraft wing, and makes it possible to transmit to the structure of this aircraft the forces generated by its associated jet engine, and also allows the routing of the fuel and the electrical, hydraulic and air systems between the jet engine and the aircraft.

On the jet engines of recent aircrafts, the high dilution rate sought for the purpose of reducing noise and pollution nuisances leads to obtaining an extremely high space requirement for the engine zone since an increase in the dilution rate unavoidably causes an increase in the diameter of the engine, and more particular an increase in the diameter of its blower casing.

Thus, with a ground clearance that is naturally fixed so as to remain acceptable from the safety point of view, the space remaining between the wing and the jet engine serving to house the attachment strut for the latter is more and more restricted.

This development in jet engines has had the consequence of bringing the engine much closer to the wing and therefore also reducing the dimensions of the attachment strut. However, it has been remarked that this close configuration of the engine and wing, also referred to as "close-coupling" configuration, led to detrimental aerodynamic effects resulting directly from the close proximity of the engine nacelle, the attachment strut and the aircraft wing.

Effectively, tests carried out first of all made it possible to detect a stray transverse flow above the front zone of the attachment strut, that is to say the aerodynamic zone of this strut projecting from the leading edge of the wing forwards and pressed against a top portion of the nacelle in order to procure aerodynamic continuity with it. This stray transverse flow issues roughly from a front end of the lateral flank of the strut oriented towards the proximal end of the wing, and is characterised by the fact that in advancing it passes above the peak line of the attachment strut, instead of being maintained along this same flank until it reaches the bottom of the wing. Thus the stray flow reaches the side of the strut oriented towards the distal end of the wing.

Moreover, in addition to this stray transverse flow resulting in a movement going from the lateral flank of the strut oriented towards the proximal end of the wing, towards the opposite lateral flank oriented towards the distal end thereof, there has also been detected a detrimental phenomenon of turbulent separation at the trailing edge of the nacelle and enveloping the engine suspended by the attachment strut in question. This turbulent separation is characterised by a coiling of the streams of air around a point situated in a zone that is therefore the seat of energy losses, and therefore aerodynamic drag, since the boundary layer is no longer laminar.

These two stray phenomena are mainly explained by the fact that the trailing edge of the nacelle is then situated in the wing compression fields. Thus the flow attempts to pass round this wing compression zone and changes with the aforementioned stray transverse movement. In this regard, it should be noted that this phenomenon is so strong that it gives rise to the turbulent separation in question in the zone where the compression of the wing is the greatest. The turbulent separation thus gives rise to a local increase in the boundary layer on the nacelle, which results in a detrimental increase in the viscous pressure drag of the nacelle and therefore an overall loss of performance of the aircraft.

The aim of the invention is therefore to propose a wing arrangement for remedying the aforementioned drawbacks encountered in the embodiments of the prior art.

To do this, an object of the invention is an aircraft wing arrangement comprising a wing having a distal end and a proximal end, as well as at least one strut for attaching the aircraft engine suspended under the wing and comprising a front zone situated projecting forwards with respect to a leading edge of the wing. According to the invention, the front zone of the attachment strut comprises a lateral projection delimiting a lateral air flow channel while being projected towards the proximal end of the wing. In addition, the lateral projection has a rear end in contact with the leading edge of the wing as well as a front end, the lateral projection being projected towards the proximal end of the wing over a projection length increasing going from its front end to its rear end.

The invention therefore sets out to resolve the problem of stray transverse flow encountered in the prior art by the addition of a lateral projection, able for example to take the form of a lip extending along the front zone, which therefore participates in the formation of an air flow channel along the lateral strut flank oriented towards the proximal end of the wing, referred to as the first lateral flank. Thus the air flow coming from the front end of the first lateral flank is no longer subject to a stray transverse movement since it is channelled along this same first flank by the lateral projection preventing it from being diverted in the direction of the peak line of the attachment strut.

Next, the air flow channelled by the lateral projection is accelerated by the very shape of the channel in question and discharges in a favoured direction under the aircraft wing, between the lower surface of this wing and the engine nacelle. For this reason, the phenomenon of turbulent separation at the leading edge of the nacelle is greatly minimised, or even totally eradicated, which advantageously results in a decrease in the viscous pressure drag of the nacelle and therefore an improvement in the overall performance of the aircraft.

In addition, provision is therefore made for this lateral projection projecting towards the proximal end of the wing to have a rear end in contact with the leading edge of the wing. It therefore next extends towards the front of the attachment strut along the latter, preferably substantially straight, still projecting towards the proximal end of the wing.

In particular, the lateral projection has the rear end in contact with the leading edge of the wing as well as a front end, and projects towards the proximal end of the wing over a projection length increasing going from its front end to its rear end. This specificity advantageously progressively refines the definition of the air flow channel on approaching the leading edge of the wing, and therefore makes it possible to have a smooth front lateral projection end, providing aerodynamic continuity of the front zone of the attachment strut at the initiation of this projection.

Preferentially, the lateral project has, from its front end to its rear end, a free lateral edge of rounded shape. This also limits the aerodynamic disturbance liable to be caused by the present of the lateral projection specific to the present invention and consequently provides an air flow that is very little disturbed all around the front zone of the attachment strut.

Preferably, the attachment strut therefore has a first lateral flank oriented towards the proximal end of the wing, this first lateral flank having a concave-shaped portion at least partially participating in the definition of the lateral projection. This is because it should be noted that the formation of the lateral projection involves the production of a first lateral flank having a concave-shaped portion, unlike the embodiments of the prior art in which the external surface of the strut was planar and convex. In this regard, it should be noted that the concave-shaped portion of the first lateral flank preferably extends all along the projection and may possibly extend beyond the front zone of the attachment strut, that is to say under the wing towards the rear with respect to the projection, in particular for reasons of aerodynamic continuity of this first lateral flank.

The lateral projection can also be defined conjointly with the top flank of the front zone of the attachment strut, without departing from the scope of the invention.

As is clear from the above, it should be noted that the lateral projection is provided at the top part of the front zone of the attachment strut, so as to direct the air flowing in the lateral air flow channel, under the wing of the aircraft. To do this, the projection can effectively be defined conjointly by the concave top portion of the first lateral flank and by the lateral portion of the top flank that is oriented towards the proximal end of the wing.

In order to obtain the most satisfactory possible channelling for the flow of air by means of the lateral projection, arrangements can be made so that, in a view from above, it is present over at least 60% of the length of the front zone of the attachment strut, considered along a longitudinal axis of the strut passing through a front end point thereof. In more general terms, but still preferentially, provision is made for this lateral projection to be present over 50% to 100% of the length of the front zone projecting from the leading edge, preferentially extending from the latter.

Finally, it should be noted that the arrangement comprises for example two aircraft engine attachment struts, each of them being equipped with the lateral projection on its front zone, projecting naturally towards the proximal end of the same wing. Nevertheless, the invention preferentially applies to a twin-engine aircraft.

Another object of the invention is an aircraft comprising at least one wing arrangement as described above.

Other advantages and characteristics of the invention will emerge from the following non-limitative detailed description.

This description will be given with regard to the accompanying drawings, among which:

Figure 1:
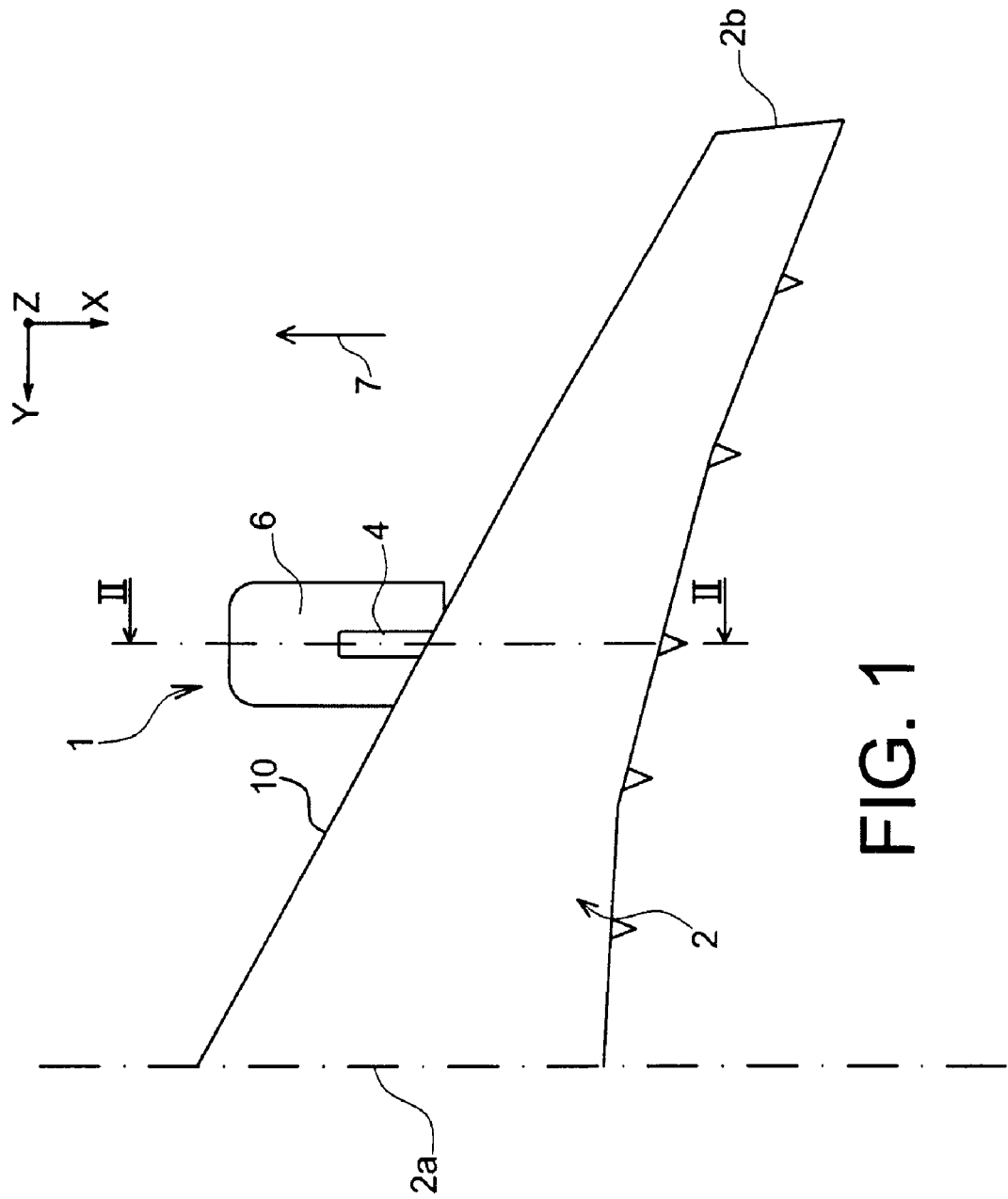
FIG. 1 depicts a plan view of an aircraft wing arrangement according to a preferred embodiment of the present invention.

First of all, with reference to FIG. 1, an aircraft wing arrangement 1 according to a preferred embodiment of the present invention can be seen, this arrangement 1 comprising overall a wing 2 having a proximal end 2a intended to be attached fixedly to the aircraft fuselage, and a free end opposite to it, referred to as the distal end 2b.

In addition, the wing arrangement 1 also comprises at least one engine attachment strut 4 suspended fixedly under the wing 2, and preferably a single strut 4 supporting an engine 6 such as a jet engine, as shown in FIG. 1. By way of indication, it can indifferently be considered whether or not this jet engine 6 belongs to the wing arrangement 1 that is the object of the present invention.

Throughout the description that follows, by convention, the longitudinal direction of the attachment struts, which can also be assimilated to the longitudinal direction of the aircraft and jet engines of the latter, is referred to as X. In addition, the direction oriented transversely with respect to the attachment struts and also able to be assimilated to the transverse direction of the aircraft and jet engines of the latter is referred to as X, and finally the vertical direction or the height is referred to as Z, these three directions X, Y and Z being orthogonal to one another.

Moreover, the terms "front" and "rear" are to be considered with respect to a direction of travel of the aircraft encountered following the thrust exerted by the jet engines, this direction being represented schematically by the arrow 7.

Figure 2:
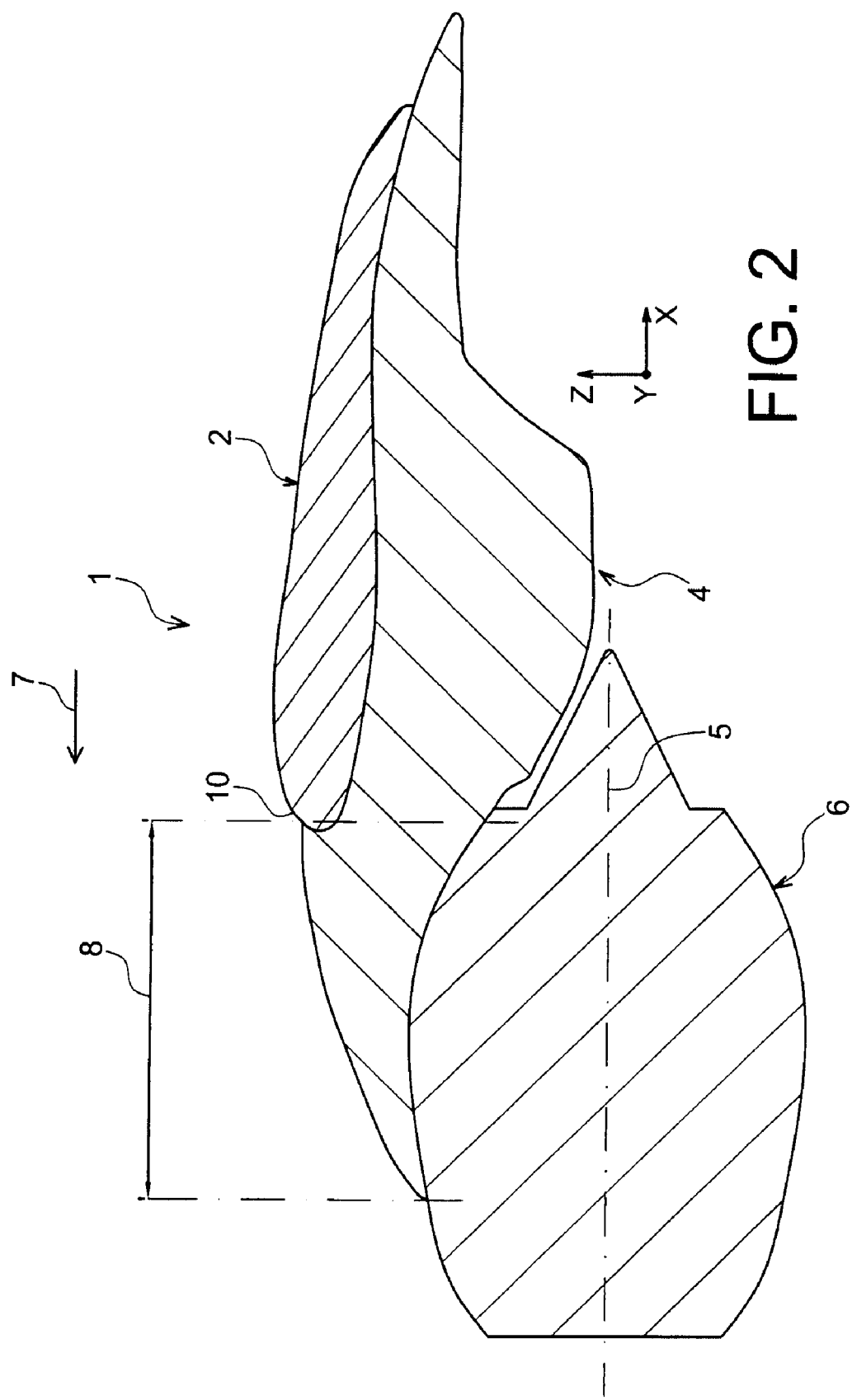
FIG. 2 depicts a schematic view in section along the line II-II in FIG. 1.

With reference now to FIG. 2 showing schematically an assembly of the arrangement 1 comprising the jet engine 6, its associated attachment strut 4 and the wing 2, it should be stated that the strut 4 normally comprises a rigid structure, also referred to as the primary structure, carrying attachment means for the engine, these attachment means having a plurality of engine attachments and a device for taking up the thrust forces generated by the engine. Moreover, the jet engine 6 is surrounded by a nacelle as can be seen in FIG. 2, and the attachment strut 4 comprises another series of attachments (not shown) attached to the rigid structure and providing the suspension of this strut under the aircraft wing.

In this FIG. 2 showing the longitudinal axis 5 of the jet engine 6 parallel to the direction X, it can be seen that the strut 4 has overall an aerodynamic shape resulting from the presence of secondary structures added to the primary rigid structure and ensuring the segregation and maintenance of the systems whilst supporting aerodynamic fairings. By way of indication, among these secondary structures (not referenced) of the strut 4, there are a front aerodynamic structure, a rear aerodynamic fairing, a fairing connecting the front and rear aerodynamic structures, also referred to as a fillet, and a lower rear aerodynamic fairing, also referred to as a "shield" or "aft pylori fairing", the essential functions of which are the formation of a fire barrier and the formation of aerodynamic continuity between the engine discharge and the attachment strut.

In the context of the invention, the concern is mainly with a zone of the attachment strut 4 referred to as the front zone 8, delimited by the broken lines in FIG. 2, and having the particularity of projecting forwards from a leading edge 10 of the wing 2 with which this front zone 8 is connected. The front zone 8, essentially formed by the aforementioned front aerodynamic structure, is pressed against a top portion of the nacelle in order to procure aerodynamic continuity therewith.

Figure 3:
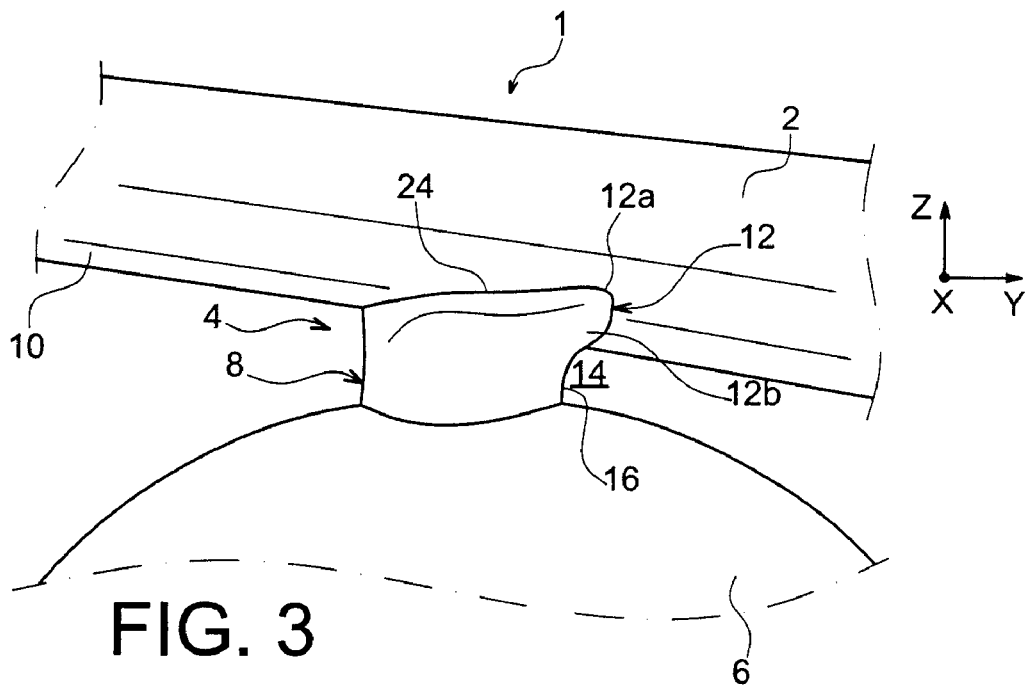
FIG. 3 depicts a partial front view of the wing arrangement shown in FIG. 1.
Figure 4:
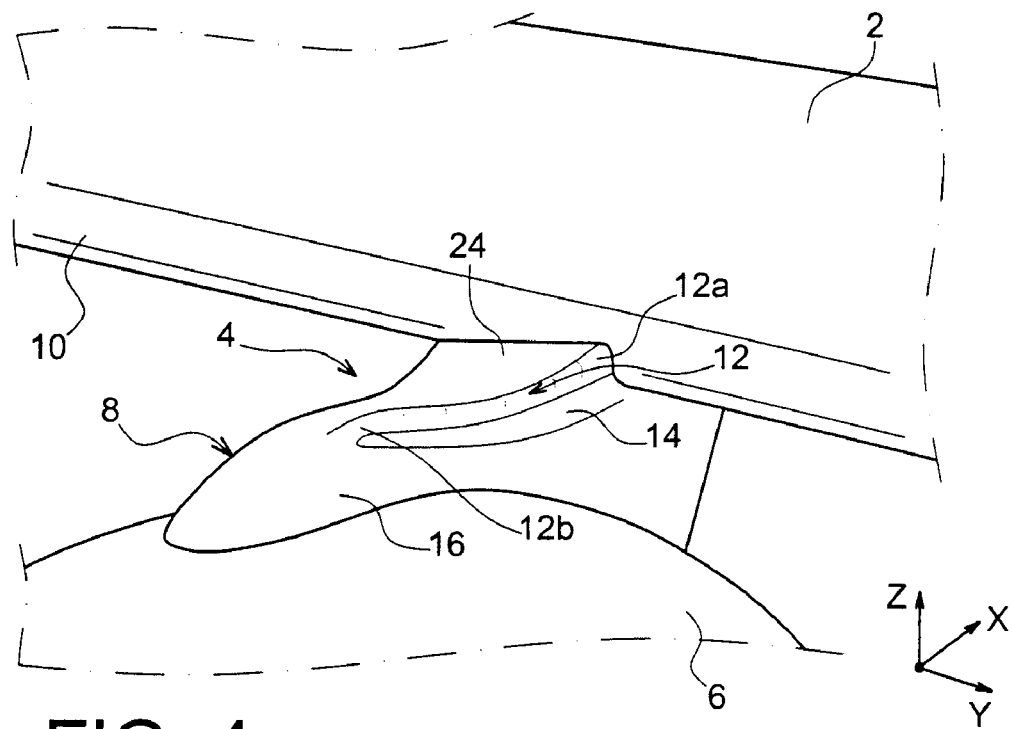
FIG. 4 depicts a partial view in perspective of the wing arrangement shown in FIG. 1.

With reference now to FIGS. 3 and 4, showing more precisely the front zone 8 of the attachment strut 4, it can be seen that one of the particularities of the present invention lies in the fact that this front zone 8 comprises a lateral projection 12 delimiting a lateral air flow channel 14, being projected towards the proximal end (not shown) of the wing 2.

The lateral projection 12 is present at the top part of the front zone 8, so that the channel 14 that it delimits is roughly situated under this same projection 12, which preferably has a rear end 12a in contact with the leading edge 10. In this way, it can be understood that the air flow channel 14 formed by the projection 12 easily makes it possible to direct the air following this channel 14 towards the bottom part of the wing 2, as is more clearly visible in FIG. 3.

In order to produce this lateral extension 12 that extends along the front zone 8, for example substantially straight parallel to the direction X, or so as to follow a slightly curved line (case not shown), provision is made for the first lateral flank 16 oriented towards the proximal end of the wing having a portion with a concave shape participating at least partially in the definition of this lateral projection, as appears clearly in FIGS. 3 and 4. In this regard, it should be noted that the concave-shaped portion of the first lateral flank 16 may possibly extend towards the rear beyond the front zone 8 delimited in FIG. 2, and therefore below the bottom surface of the wing 2, without departing from the scope of the invention.

Thus the specificity related to the presence of this projection 12, which can here be assimilated to a lip projecting in the direction of the proximal end of the wing and extending from the leading edge 10 along the front zone 8, is that the air flow coming from a front end of the first lateral flank 16 is no longer subject to a stray transverse movement since it is progressively channelled along this same first flank 16 by the lateral protection 12 preventing it from diverting towards the peak line of the attachment strut, and forcing it therefore to follow the channel 14.

As will be disclosed in more detail below, the projection 12 is initiated from a very small front end preserving the aerodynamic continuity with the front end part of the zone 8, and then enlarges gradually as it approaches its rear end 12a in contact with the leading edge 12a. In other words, this lateral projection 12 projects over a greater and greater length in the direction of the proximal end of the wing when it approaches the leading edge 10. Thus, between these two front and rear ends, the projection 12 of increasing size going towards the rear has a free lateral edge, that is to say its edge oriented towards the proximal end of the wing and constituting the lateral end of the projection, with a rounded shape propitious to a good aerodynamic flow.

Figure 5:
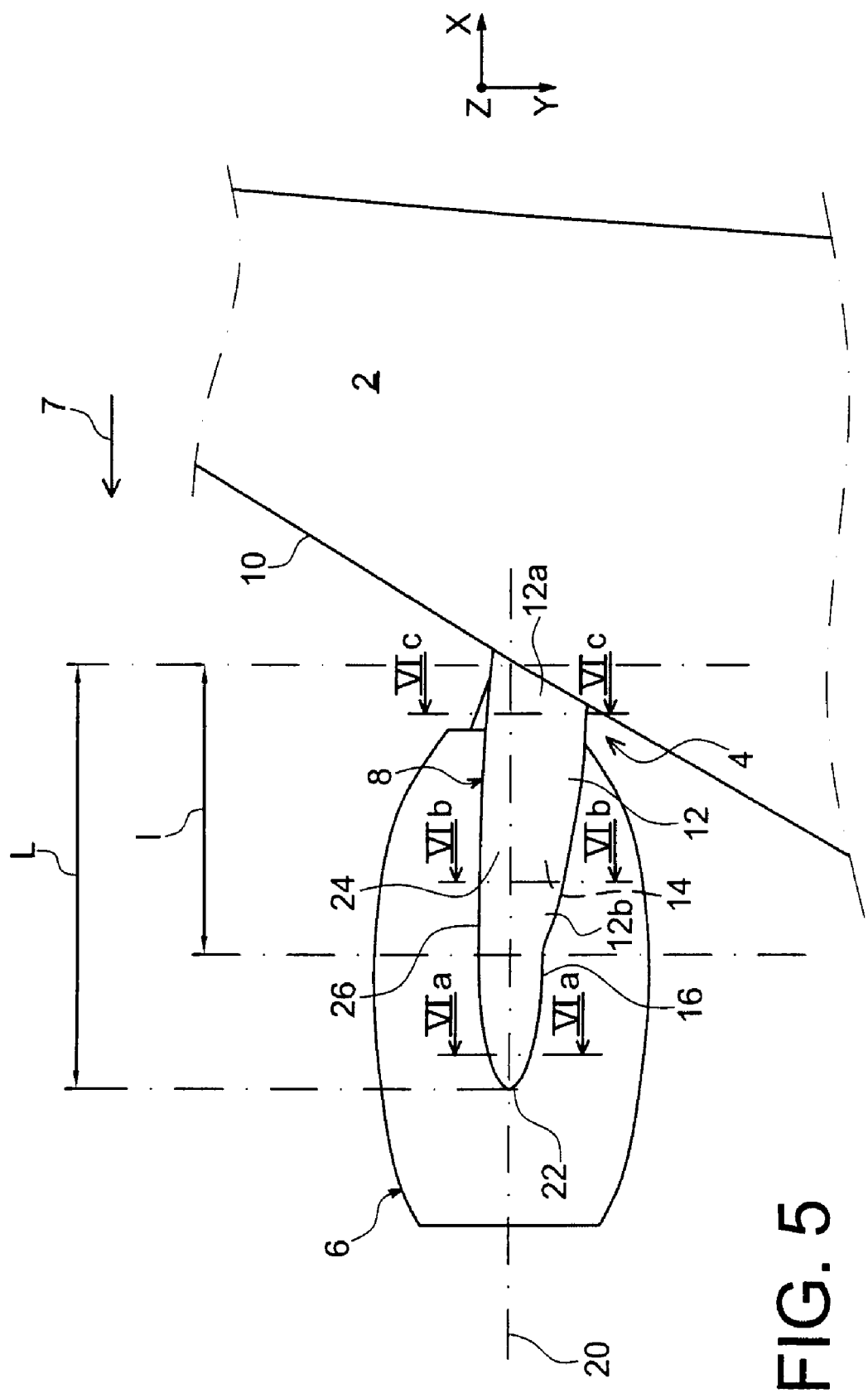
FIG. 5 depicts a detailed partial plan view of the wing arrangement shown in FIG. 1.

With reference more specifically to FIG. 5 showing a partial plan view of the arrangement 1, it can be seen that the lateral projection 12 extends over a length "l" preferably representing at least 60% of the length "L" of the front zone of the attachment strut, these two lengths being considered along a longitudinal axis 20 of the strut preferably parallel to the direction X and passing through a front end point 22 of the zone 8 thereof, this axis 20 normally being merged with the longitudinal axis 5 of the jet engine in plan view. As indicated previously, the projection 12 is initiated from its front end 12b provided at the rear with respect to the point 22, while its rear end 12a comes to be fixed on the leading edge 10 of the wing. By way of indication, the percentage noted above may be extended to a range from 50% to 100%, according to the aerodynamic requirements encountered.

Still with reference to FIG. 5 and as mentioned above, it can be seen that the projection 12, situated in the top portion of the zone 8 between the first lateral flank 16 of this zone and the top length 24 thereof, is projected toward the proximal end of the wing over an increasing projection length going from its front end 12b to its rear end 12a.

This particularity, which may be represented by a projection enlarging going towards the rear, will be explained better with reference to FIGS. 6a to 6c.

Figure 6A:
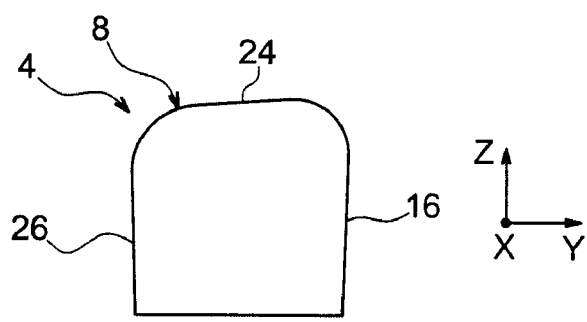
FIG. 6a is a view in section along the line VIa-VIa in FIG. 5.
Figure 6B:
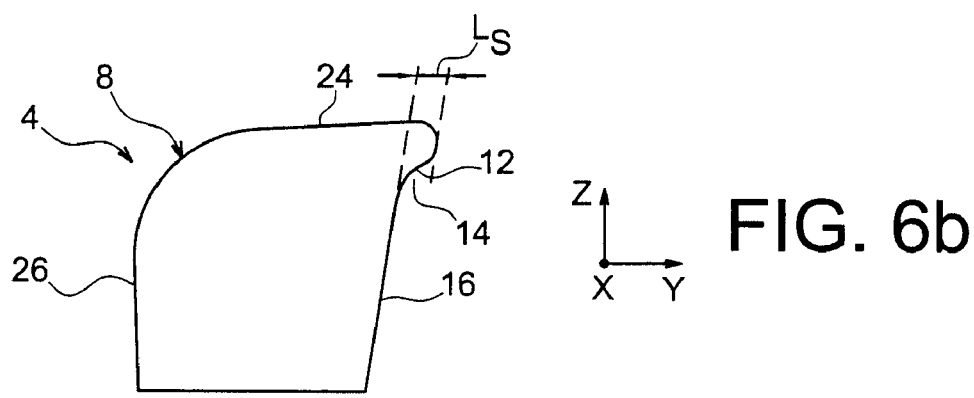
FIG. 6b is a view in section along the line VIb-VIb in FIG. 5.
Figure 6C:
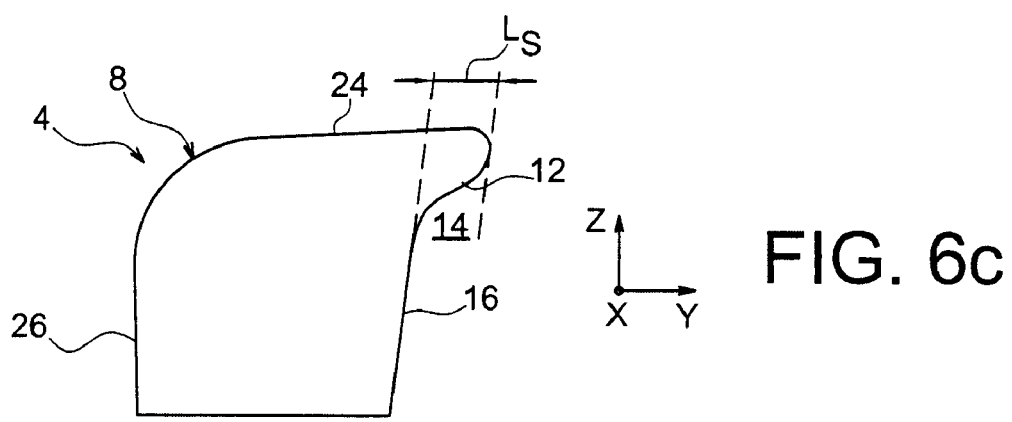
FIG. 6c is a view in section along the line VIc-VIc in FIG. 5.

This is because it can be seen in FIG. 6a that the front zone 8, in a front end part not comprising the projection 12, has in transverse section an external surface of conventional design, namely the two lateral flanks 16, 26 are substantially flat at the base and convex at their top ends, which are joined by means of the top flank 24 with a convex and/or flat shape.

Next, close to the front end 12b of the projection 12, it can be seen that the zone 8 seen in transverse section has an external surface whose top part has a rounded protrusion forming the protection 12, this protrusion being oriented substantially transversely towards the proximal end of the wing. As is clear from FIG. 6b, the protrusion is obtained conjointly with the at least partially concave top portion of the first lateral flank 16 and with the lateral portion of the top flank 24, which is convex and oriented towards the proximal end of the wing.

The projection 12 is then projected over a relatively small projection length "Ls", which is considered in the direction Y between two parallel straight lines passing respectively through the straight initial part of the flank 16, and through the lateral end point of the protrusion seen in cross section. It should be noted that the curved shape of the protrusion shows clearly the rounded shape desired for the free lateral edge of the projection, discussed previously.

Finally, close to the rear end 12a of the projection 12, it can be seen that the zone 8 seen in transverse section has an external surface whose top part has a rounded protrusion forming the projection 12, this protrusion also being oriented substantially transversely towards the proximal end of the wing. Here too, as is clear from FIG. 6c, the protrusion is obtained conjointly with the at least partially concave top portion of the first lateral flank 16 and with the lateral portion of the top flank 24, which is convex and oriented towards the proximal end of the wing. On the other hand, the projection 12 is projected here over a relatively great projection length "Ls", which is still considered in the direction Y between two parallel straight lines passing respectively through the straight initial part of the first flank 16 and through the lateral end point of the protrusion seen in this new section.

Naturally, between these last two sections, the protrusion forming the lateral projection 12 has a progressively increasing projection length.

Finally, provision is preferably made for the other lateral flank of the attachment strut 4, referred to as the second lateral flank 26, to have a shape and design identical to those encountered in the prior art and known to persons skilled in the art.

Naturally various modifications can be made by persons skilled in the art to the wing arrangement 1 according to the invention that has just been described solely by way of non-limitative example. In particular, it should be noted that, although the invention has been described in relation to the attachment strut of a twin-engined aircraft, it could also apply in a similar fashion to an internal attachment strut of a four-engined aircraft, and possible to an external strut of a four-engined aircraft.

The invention claimed is:
1. An aircraft wing arrangement comprising:
   a wing comprising a distal end, a proximal end, at least one strut for attaching the aircraft engine suspended under the wing, and a front zone situated projecting towards the front with respect to a leading edge of the wing, wherein the front zone of the attachment strut comprises a lateral projection delimiting a lateral air flow channel while being projected towards the proximal end of the wing, and wherein the lateral projection includes a rear end surface in contact with the leading edge of the wing on a front end, the lateral projection being projected towards the proximal end of the wing over a projection length increasing going from its front end to its rear end.

2. A wing arrangement according to claim 1, wherein the lateral projection includes, from its front end to its rear end, a free lateral edge rounded in shape.

3. A wing arrangement according to claim 1 wherein the attachment strut includes a first lateral flank oriented towards the proximal end of the wing, the first lateral flank including a concave-shaped portion participating at least partially in definition of the lateral projection.

4. A wing arrangement according to claim 1, wherein the lateral projection is provided at a top part of the front zone of the attachment strut, so as to direct air flowing in the lateral air flow channel under the wing.

5. A wing arrangement according to claim 1, wherein, in plan view, the lateral projection is present over at least 60% of the length of the front zone of the attachment strut, considered along a longitudinal axis of the strut passing through a front end point thereof.

6. A wing arrangement according to claim 1, comprising two aircraft engine attachment struts, each of the struts including the lateral projection on its front zone.

7. An aircraft, comprising at least one wing arrangement according to claim 1.

* * * * *